US012779750B2

(12) United States Patent
Kasberger et al.

(10) Patent No.: US 12,779,750 B2
(45) Date of Patent: Nov. 3, 2026

(54) ROLLER, IN PARTICULAR FOR A SLIDING DOOR

(71) Applicant: Edscha Engineering GmbH, Remscheid (DE)

(72) Inventors: Josef Kasberger, Remscheid (DE); Thorsten Weiss, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 951 days.

(21) Appl. No.: 18/012,873

(22) PCT Filed: Jun. 2, 2021

(86) PCT No.: PCT/DE2021/100481
§ 371 (c)(1),
(2) Date: Dec. 23, 2022

(87) PCT Pub. No.: WO2021/259415
PCT Pub. Date: Dec. 30, 2021

(65) Prior Publication Data

US 2023/0243197 A1 Aug. 3, 2023

(30) Foreign Application Priority Data

Jun. 26, 2020 (DE) ..................... 20 2020 103 707.2

(51) Int. Cl.
*B29C 45/00* (2006.01)
*E05D 15/06* (2006.01)
*B29L 31/32* (2006.01)

(52) U.S. Cl.
CPC ...... *B29C 45/0001* (2013.01); *B29C 45/0053* (2013.01); *E05D 15/06* (2013.01);
(Continued)

(58) Field of Classification Search
None
See application file for complete search history.

(56) References Cited

U.S. PATENT DOCUMENTS

2011/0216994 A1 9/2011 Grunau et al.

FOREIGN PATENT DOCUMENTS

CN 102124239 A 7/2011
DE 102006017346 A1 * 10/2007 ............. C08J 3/226
(Continued)

OTHER PUBLICATIONS

R. Feulner, et al. The effects of e-beam irradiation induced cross linking on the friction and wear of polyamide 66 in sliding contact, Wear. vol. 268, Issues 7-8, pp. 905-910 (2010) (Year: 2010).*
(Continued)

*Primary Examiner* — Sanza L. McClendon
(74) *Attorney, Agent, or Firm* — Davidson Kappel LLC

(57) ABSTRACT

A roller, in particular for a sliding door of a vehicle, includes a main part having a running surface pointing radially outward. The running surface can be coupled to a guide rail of a sliding door. The roller also includes a central bore, penetrating the main part at least in part, for receiving a bearing arrangement for rotatable mounting of the main part. A roller which is cost-effective to manufacture and is additionally durable is created in that at least the running surface consists of a radiation-crosslinked plastic having a gel value in formic acid between 20% and 60%.

17 Claims, 1 Drawing Sheet

(52) U.S. Cl.
CPC . *B29C 2045/0075* (2013.01); *B29L 2031/322* (2013.01); *E05Y 2900/531* (2013.01)

(56) References Cited

FOREIGN PATENT DOCUMENTS

| | | | | | |
|---|---|---|---|---|---|
| DE | 102008038578 | A1 | * | 2/2010 | ............. B29C 71/04 |
| DE | 102009042696 | A1 | | 3/2011 | |
| DE | 102011054629 | A1 | * | 4/2013 | ................ C08J 3/28 |
| DE | 102011054692 | A1 | | 4/2013 | |
| DE | 102022132358 | B3 | * | 3/2024 | ......... B29C 45/2708 |
| EP | 2855572 | A1 | | 4/2015 | |
| EP | 3569658 | A1 | * | 11/2019 | ......... C08K 5/34924 |
| JP | 2004028161 | A | * | 1/2004 | |
| JP | 2005076859 | A | * | 3/2005 | |
| JP | 2006177468 | A | * | 7/2006 | |
| JP | 2007077346 | A | * | 3/2007 | |
| WO | WO-02103214 | A1 | * | 12/2002 | ............ F16C 29/045 |

OTHER PUBLICATIONS

Non-standard Bearing—OEM Sliding Door Bearing Wheels product description [online]. MKL Bearings Warehouse. Accessed via the WayBack Machine on Nov. 10, 2025, >https://web.archive.org/web/20201201024417if_/https://www.mklbearing.com/oem-sliding-door-bearing-wheels_p290.html>. Published on Dec. 1, 2020. (Year: 2020).*

Mária Porubská. Radiation Effects in Polyamides in Radiation, chapter 10 (2016) as found Radiation Effects in Materials 10th Ed., 2016. [online]. [Retrieved on Nov. 17, 2025]. Retrieved from the internet: <https://www.intechopen.com/chapters/50181>. (Year: 2016).*

Nagasawa et al.Radiation-induced crosslinking of polyamide11 in the presence of triallylisocyanurate. Polymer Degradation and Stability,vol. 136, pp. 98-102 (2017). (Year: 2017).*

See International Search Report for corresponding PCT/DE2021/100481.

* cited by examiner

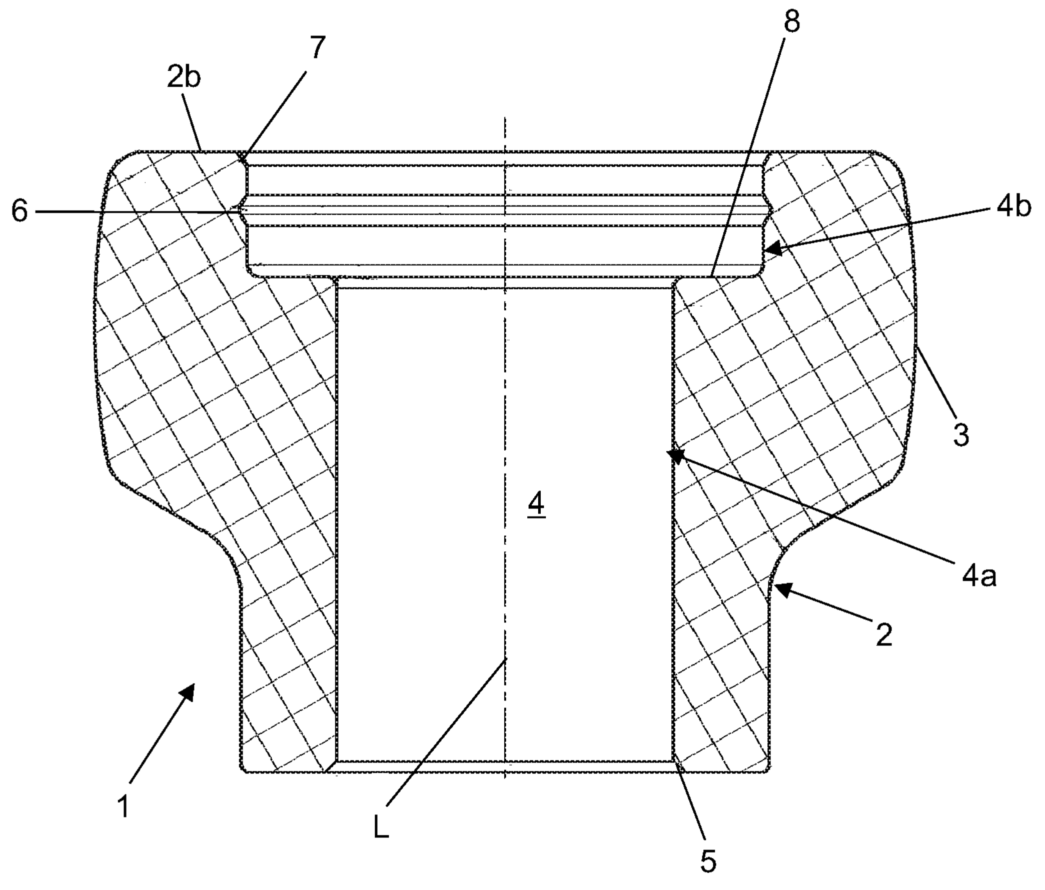
2b
7
8
6
4b
3
4
4a
2
1
L
5

ROLLER, IN PARTICULAR FOR A SLIDING DOOR

The present disclosure relates to a roller, in particular for a sliding door, comprising a main body with a running surface pointing radially outward, wherein the running surface is coupleable to a guide rail of a sliding door; and a central bore, which extends at least partially through the main body, for receiving a bearing arrangement for rotatable mounting of the main body.

BACKGROUND

From praxis, sliding doors are known which, for example, are used in rail vehicles or other vehicles. The sliding door is respectively suspended on a guide arrangement, wherein the guide arrangement comprises a guide rail which normally consists of metal. The displacement of the sliding door along the guide rail as easy as possible is realized by using rollers which comprise a main body with a running surface, wherein the running surface is connected to the base of the guide rail so that the rollers can roll along the guide rail. For this purpose, the roller comprises a bore which extends at least partially through the main body and into which a bearing element is inserted, whereby the main body is rotatably mounted about an axis of rotation defined by the bearing element.

The sliding door, which is to be displaced manually or by motor, is normally coupled to the roller or rollers so that the sliding door can be displaced in its own plane without great expenditure of force. Depending on the weight of the sliding door, high abrasion forces act on the running surface of the main body in the course of the operation, whereby a limited service life of the roller caused by wear results. After this service life has elapsed, the replacement of the roller and, if applicable, also of the bearing element is necessary. The main body of known rollers is therefore often produced from a corresponding plastic such as, for example, polyamide 12, which is a polyamide having a sufficient hardness and resistance. Such rollers made of polyamide 12 are continuously cast to form semifinished products and then turned to the finished roller dimension. The manufacturing process of the rollers is accordingly disadvantageously complicated and expensive.

DE 10 2011 054 692 A1 shows a method for producing articles from radiation-crosslinked polyamide. The method comprises the temporally successive method steps of the radiation-crosslinking of a polyamide raw material in the solid state and subsequent shaping of the radiation-crosslinked polyamide raw material to form an end product. For the radiation-crosslinking, a crosslinking additive, which may be solid, liquid, or gaseous, is added to the polyamide raw material. Triallyl cyanurate and triallyl isocyanurate, which are used in concentrations of 0.01 to 20%, are mentioned as being particularly suitable. The radiation-crosslinking takes place at a temperature at which the polyamide raw material is present in the solid phase. The irradiation preferably takes place at a temperature below the crystalline melting temperature of the polyamide raw material, so that the amorphous regions are preferably branched/partially crosslinked, whereas the crystalline regions remain largely unchanged in order to enable the further processing of the crosslinked polyamide. The irradiation takes place by means of ionizing radiation, in particular electron radiation, wherein the irradiation dose is in the range of from 1 to 60 kGy. Due to the relatively low irradiation dose, the crosslinked polyamide has a relatively low degree of crosslinking with a gel content of between 0.01 and 10%. The end product subsequently obtained by shaping disadvantageously likewise has a low degree of crosslinking, so that a sufficient durability is not provided for certain use cases, in particular for rollers.

DE 10 2009 042 696 A1 shows a roller for a transport or separating device for documents of value, comprising a main body with a central bore, which extends at least partially through the main body, for receiving a bearing arrangement for rotatable mounting of the main body. Furthermore, the roller comprises a peripheral portion arranged on the main body, with a radially outwardly pointing running surface, wherein the running surface consists of a radiation-crosslinkable thermoplastic elastomer material. A disadvantage of the shown roller is that it consists of two components which are produced individually for the production of the roller and must be connected to one another in a precise fit. The roller disadvantageously has a correspondingly high material outlay and is correspondingly cost-intensive and time-consuming in terms of its production.

DE 102006017346 A1 discloses a migration-stable master batch comprising a radiation-crosslinkable plastic, wherein the radiation-crosslinkable plastic comprises a polyfunctional monomer.

SUMMARY

It is the object of the present disclosure to specify a roller, in particular for a sliding door, which is cost-effective to manufacture and additionally is durable.

According to one aspect of the present disclosure, a roller, in particular for a sliding door of a vehicle, is created, comprising a main body with a running surface pointing radially outward, wherein the running surface is coupleable to a guide rail of a sliding door. Furthermore, the roller comprises a central bore, which extends at least partially through the main body, for receiving a bearing arrangement for rotatable mounting of the main body. The roller is characterized in that at least the running surface consists of a radiation-crosslinked plastic having a gel value in formic acid of between 20% and 60%. Advantageously, the roller can be produced by, for example, an injection molding process and subsequent irradiation, wherein the basic shape and the final dimension of the roller can be achieved without additionally required working steps. In particular, if no subsequent deformations or a turning to the finished roller dimension are necessary, the production costs advantageously decrease accordingly. In order to simultaneously achieve a durability of the roller, the roller at least in the region of the running surface which, in operation, predominantly experiences an abrasion effect is more resistant by using radiation-crosslinked plastic with a relatively high gel value. Advantageously, the advantageous curing of the running surface by means of radiation-crosslinking is also maintained in that a reworking of the surface of the roller by turning or milling is not provided or required.

The entire main body particularly preferably consists of a radiation-crosslinkable plastic. The main body can advantageously be produced simply and cost-effectively via a conventional injection molding process using material which is present, for example, in granulate form and consists of a radiation-crosslinkable plastic. In particular, it is advantageously not necessary to produce the roller using two components in separate work steps. In addition, surfaces of the main body adjoining the running surface can thus advantageously also be cured subsequently by irradiation performed after the demolding, so that the durability of less loaded surfaces of the main body is also not reduced.

In a particularly preferred embodiment of the roller, it is provided that the radiation-crosslinked plastic comprises a polyamide; in an expedient embodiment, the radiation-crosslinked plastic comprises polyamide 66 (PA 66). Advantageously, the main body can thus be produced by easy adaptation of the production parameters in an injection molding process, as is known given other components which consist of non-crosslinked polyamide.

The radiation-crosslinked or radiation-crosslinkable plastic expediently comprises a crosslinking additive. Crosslinking additives advantageously enhance the crosslinking of the plastic or accelerate the crosslinking, so that a subsequent curing of the plastic is effectively possible via brief irradiation. In particular, the crosslinking additive is a polyfunctional monomer. The crosslinking additive is particularly preferably one of triallyl isocyanurate and triallyl cyanurate. Polyfunctional monomers are suitable in particular for the radiation-crosslinking of polyamide, so that the roller produced on the basis of polyamide is formed correspondingly cost-effectively in a first method step via injection molding and can subsequently be effectively cured via brief irradiation.

The crosslinking additive is expediently contained in the radiation-crosslinked plastic in a concentration of between 0.01% and 20%.

The crosslinking additive in the radiation-crosslinked plastic is particularly preferably contained in a concentration of between 12.5% and 17.5%, preferably of approximately 15%. Advantageously, a gel value in formic acid of from 35% to 59% can be achieved with relatively low irradiation times, so that the downstream curing of the rollers can be performed in a relatively short time. The manufacturing costs of the rollers advantageously decrease accordingly.

Advantageously, the radiation-crosslinked plastic has a modulus of elasticity of between 3000 MPa and 4000 MPa, preferably of approximately 3500 MPa.

Furthermore, the radiation-crosslinked plastic has a Charpy impact toughness of between 50 $KJ/m^2$ and 55 $KJ/m^2$, preferably of approximately 52 $KJ/m^2$ at 23° C. In addition, the radiation-crosslinked plastic preferably has a Charpy notched impact toughness of between 3 $KJ/m^2$ and 7 $KJ/m^2$, preferably of approximately 5 $KJ/m^2$.

Advantageously, the roller is thereby sufficiently resistant to deformations due to forces or impacts acting on the roller from the outside. In particular, it is hereby advantageously ensured that the roller remains displaceable reliably within the guide rail over as many load changes as possible before a replacement is required. The rollers, or the radiation-crosslinked plastic, are/is particularly preferably designed such that the roller passes what is known as a soldering iron test after the irradiation. In the soldering iron test, a soldering iron with a defined soldering iron tip is placed on a test marking defined on the roller. The soldering iron tip consists of steel and has a diameter of approximately 1 mm. The test temperature, i.e. the temperature of the soldering iron tip, during the test is 350° C., and the loading force is 10 N. The soldering iron test is considered to be passed if the soldering iron tip does not penetrate deeper than 0.2 mm into the roller at the location of the test marking during the test lasting 5 s.

According to a further aspect, a method for producing a roller, in particular for a sliding door, is created, wherein the method comprises the following method steps: In a first method step, the injection molding of a main body of the roller takes place in a molding tool, wherein a radiation-crosslinkable plastic is used as a base material. In a second method step, the injection-molded main body is demolded from the molding tool. In a third method step, an irradiation of at least the running surface of the main body with beta radiation takes place. Advantageously, the roller can be produced in large numbers in the known injection molding process, wherein the durability of the roller is significantly improved by the subsequent irradiation of the main body with beta radiation and the crosslinking of the plastic that is thereby activated, at least in the region of the running surface of the main body.

The dose of beta radiation is particularly preferably 90 kGy to 110 kGy, preferably approximately 100 kGy. More preferably, the beta radiation has an energy of between 7 MeV and 13 MeV, preferably of approximately 10 MeV. A degree of crosslinking, or a gel value in formic acid, of between 35% and 59% is hereby advantageously achieved.

In an expedient embodiment of the method for producing a roller, it is provided that the roller is irradiated while lying in a covering or packaging after demolding. Via the lying arrangement, it is ensured that each of the rollers is subject to the same irradiation conditions. The manufacturing process is hereby advantageously simplified, since the possibility hereby also exists to perform the method step of injection molding at a first site and the subsequent irradiation at a second site, wherein the main body of the roller, obtained after the injection molding and demolding, can be packaged and brought to the second site for irradiation without the main bodys needing to be removed again from the packaging in a complicated manner for the subsequent irradiation. Advantageously, the finished irradiated rollers can again be sent in the same packaging to a third site for final assembly, in which the main body is equipped with a bearing element and installed.

According to a further aspect of the present disclosure, a roller is created that is obtainable via a method for producing a roller as described above.

Further advantages, properties and developments of the present disclosure emerge from the following description of a preferred exemplary embodiment.

BRIEF SUMMARY OF THE DRAWINGS

The present disclosure is explained in more detail in the following with reference to the accompanying drawing, using a preferred exemplary embodiment of the present disclosure.

FIG. 1 shows a preferred exemplary embodiment of a roller according to the present disclosure, in a side view sectioned longitudinally.

DETAILED DESCRIPTION

FIG. 1 shows a preferred exemplary embodiment of a roller according to the present disclosure, in a side view sectioned longitudinally. The roller 1 comprises a cylindrically symmetrical main body 2 made of a radiation-crosslinked plastic. In the exemplary embodiment shown here, the base material of the main body 2 is polyamide 66 (PA 66), wherein a crosslinking additive having a proportion of approximately 15% was supplied to the polyamide. In the exemplary embodiment shown here, the crosslinking additive is triallyl cyanurate.

The main body 2 has been produced via an injection molding process, so that the production costs for the roller 1 are advantageously low. Subsequently, the main body 2 was subsequently radiation-crosslinked by means of beta radiation with an energy of 10 MeV and a radiation dose of 100 kGy.

The main body 2 has a running surface 3 on an upper portion, which running surface can be brought into engagement with a guide rail of a guide arrangement (not shown here). The running surface 3 has a slightly outwardly curved shape, so that the rolling resistance upon displacement of the sliding door is as small as possible and the displacement of the sliding door is accordingly easily possible.

The main body 2 further has a central bore 4, extending completely through the main body 2, which enables the receiving of a bearing arrangement for the rotatable mounting of the main body 2 about an axis of rotation L. In the exemplary embodiment shown here, the bore 4 is designed as a stepped bore so that the bore 4 has a first bore portion 4*a* and a second bore portion 4*b*, wherein the first bore portion 4*a* has a smaller inner diameter than the second bore portion 4*b*.

The first bore portion 4*a* extends in the axial direction along the axis of rotation L, from an underside 2*a* of the main body 2 to the second bore portion 4*b*. In the region of the underside 2*a*, the first bore portion 4*a* has a first bevel 5, which facilitates the passage of a bearing pin for the rotatable mounting of the main body 2.

The second bore portion 4*b* extends in the axial direction along the axis of rotation L, from the first bore portion 4*a* to an upper side 2*b* of the main body 2. A radially circumferential groove 6 is provided in the second bore portion 4*b*, which groove can be used for the pressing-in or axial securing of a bearing element in the main body 2 via a tension ring.

Finally, the second bore portion 4*b* has, in a region of the upper side 2*b* of the main body, a second bevel 7 which facilitates the insertion of the bearing element into the open receptacle formed by the second hole portion 4*b*. The annular step 8, formed between the first bore portion 4*a* and the second portion 4*b*, forms a stop surface for the bearing element.

The present disclosure has been explained in the preceding using an exemplary embodiment in which triallyl cyanurate is used as a crosslinking additive. It is understood that the use of other crosslinking additives is also possible, insofar as a crosslinking activated via subsequent irradiation of the roller or main body that is preformed after the injection molding process is effectively possible.

The present disclosure has been explained in the preceding using an exemplary embodiment in which a radiation dose of 100 kGy at a beam energy of 10 MeV of a beta radiation was used for radiation-crosslinking. It is understood that these parameters are variable insofar as, in the roller according to the present disclosure which is present at the end of the manufacturing process, a certain degree of crosslinking, preferably a gel value in the range of from 35% to 59% in formic acid, is achieved.

The present disclosure has been explained in the preceding using an exemplary embodiment in which the central bore is designed as a stepped bore. It is understood that the central bore can also be designed as a simple bore, insofar as an axial securing of a bearing element for enabling a rotational movement of the main body of the roller about the axis of rotation L is possible in the central bore.

What is claimed is:

1. A method for producing a roller for a sliding door of a vehicle, the roller comprising:

a main body with a running surface pointing radially outward, wherein the running surface is coupleable to a guide rail of the sliding door; and a central bore, which extends at least partially through the main body, for receiving a bearing arrangement for rotatable mounting of the main body, at least the running surface consisting of a radiation-crosslinked plastic having a gel value in formic acid of between 20% and 60%, wherein the method comprises the steps of:

injection molding the main body of the roller in a molding tool, a radiation-crosslinkable plastic being used as a base material;

demolding the injection-molded main body from the molding tool; and irradiating at least the running surface of the main body with beta radiation, a dose of the beta radiation being between 90 kGy and 110 kGy and the irradiation has a radiation energy of approximately 7 MeV to 13 MeV, wherein after the injection-molded main body has been demolded, the roller is arranged lying in an elastic covering during the irradiation.

2. The method according to claim 1, wherein the dose of the beta radiation is approximately 100 kGy and the irradiation has a radiation energy of approximately 10 MeV.

3. The method as recited in claim 1, wherein the radiation-crosslinked plastic is polyamide 66 (PA66) having a structure such that a soldering iron tip consisting of steel and having a diameter of approximately 1 mm is placed on a test marking defined on the roller for 5 seconds and the soldering iron tip, having a temperature of 350° C. and a loading force of 10 N, does not penetrate deeper than 0.2 mm into the roller at the location of the test marking.

4. The method according to claim 1, wherein the main body consists of a radiation-crosslinkable plastic.

5. The method according to claim 1, wherein the radiation-crosslinked plastic comprises a crosslinking additive.

6. The method according to claim 5, wherein the crosslinking additive is a polyfunctional monomer.

7. The method according to claim 5, wherein the crosslinking additive is one of triallyl isocyanurate and triallyl cyanurate.

8. The method according to claim 5, wherein the crosslinking additive is contained in the radiation-crosslinked plastic in a concentration of between 0.01% and 20%.

9. The method according to claim 5, wherein the crosslinking additive is contained in the radiation-crosslinked plastic in a concentration of between 12.5% and 17.5%.

10. The method according to claim 9, wherein the concentration is approximately 15%.

11. The method according to claim 1, wherein the gel value in formic acid is between 35% and 59%.

12. The method according to claim 1, wherein the radiation-crosslinked plastic has a modulus of elasticity of between 3000 MPa and 4000 MPa.

13. The method according to claim 12, wherein the modulus of elasticity is approximately 3500 MPa.

14. The method according to claim 1, wherein the radiation-crosslinked plastic has a Charpy impact toughness of between 50 KJ/$m^2$ and 55 kJ/$m^2$ at 23° C.

15. The method according to claim 14, wherein the Charpy impact toughness is approximately 52 KJ/$m^2$ at 23° C.

16. The method according to claim 1, wherein the radiation-crosslinked plastic has a Charpy notched impact toughness of between 3 KJ/$m^2$ and 7 KJ/$m^2$ at 23° C.

17. The method according to claim 16, wherein the Charpy notched impact toughness is approximately 5 $KJ/m^2$ at 23° C.

* * * * *